3,616,603
DECOMPOSABLE FILTER MEANS AND METHOD OF UTILIZATION
John Glenn Warner, Seneca Falls, N.Y., assignor to Sylvania Electric Products Inc.
No Drawing. Filed Nov. 21, 1969, Ser. No. 878,942
Int. Cl. B01d 37/00
U.S. Cl. 55—97                              4 Claims

ABSTRACT OF THE DISCLOSURE

A decomposable filter utilized in collecting particles of gasborne materials from a moving atmosphere. The filter comprises a formed filter medium of a water soluble organic material having structural stability in an environment having an ambient relative humidity ranging less than 90 percent and an ambient temperature ranging under 100 degrees centigrade. The filter medium is oriented in a holding means in a position to facilitate passage of the moving gas therethrough. The particles retained therein are reclaimed by dissolving the filter in water.

BACKGROUND OF THE INVENTION

This invention relates to air filters and more particularly to decomposable filter means for collecting particles of gasborne materials.

In numerous industrial and laboratory environments, such as clean-room operations and atmospherically controlled manufacturing areas, it is often desired to collect airborne particles of elusive or excess materials related to the procedures practiced in the respective areas. For instance, in certain manufacturing operations involving expensive water insoluble dusts or powders wherein some of the excess material is normally exhausted as part of the procedure, it has been found economically expeditious to collect the exhaust material in air filter arrangements which are then treated to reclaim the retained particles.

As an example, in forming color cathode ray tubes by the dry phosphor technique, one common procedure for collecting excess phosphor particles from the powder laden exhaust atmosphere during phosphor application involves passing the exhaust air through several filter mediums. The first filter is normally a coarse treatment such as a woven material capable of being vacuumed, shaken or beaten to remove the collected particles therefrom. To collect the smaller or superfine particles which have passed the coarse filter, a second or fine filter is conventionally employed. Types of filter mediums used for such applications include for example cellulose, glass or plastic substances in the form of fibrous compactions, sponge-like cellular structures having discretely arranged interconnecting pores, perforated membranes, special papers or woven materials suitably arranged in folded or layered arrays. The second filter medium is normally unsuited for mechanical removal of the collected phosphor without destroying the filter material. In some instances, the second filter medium has been dissolved in organic solvents or similar chemicals to reclaim the phosphor particles retained therein. This dissolution procedure utilizing organic solvents, or the like, is an expensive operation requiring elaborate and costly equipment which directly affects the economic feasibility of the reclamation project. In addition, the caustic solvents, in some instances, have been detrimental to the phosphor per se thereby contributing to the marginal economic aspects of the procedure.

OBJECTS AND SUMMARY OF THE INVENTION

It is an object of the invention to reduce the aforementioned disadvantages and to provide an improved means for collecting and reclaiming gasborne particles.

Another object is to provide a method for expeditiously reclaiming airborne water insoluble particles from a filter medium.

The foregoing objects are achieved in one aspect of the invention by the provision of a decomposable filter for collecting water insoluble particles of gasborne materials. The filter medium is comprised of a water soluble organic material in the form of at least one material selected from the group consisting essentially of polyvinyl alcohol, methyl cellulose, carboxyethyl cellulose, carboxymethyl cellulose, hydroxyethyl cellulose, hydroxymethyl cellulose and polyethylene oxide. The filter cartridge is positioned in a suitable housing in a manner to facilitate passage of the particle laden gas therethrough. The particled material retained in the filter medium is reclaimed by dissolving the filter in water.

DESCRIPTION OF THE PREFERRED EMBODIMENT

For a better understanding of the present invention, together with other and further objects, advantages, and capabilities thereof, reference is made to the following specification and appended claims.

It has been found that a water soluble filter medium for use in collecting water insoluble particles of gasborne substances can be made of one or more water soluble organic materials fabricated in the form having structural stability compatible with the environment in which it is used. By way of illustration, in surroundings having an ambient relative humidity ranging less than 90 percent and an ambient temperature ranging under 100 degrees centigrade, it has been found, for example, that air filter means can be constructed of at least one material selected from the group consisting essentially of polyvinyl alcohol, methyl cellulose, carboxyethyl cellulose, carboxymethyl cellulose, hydroxyethyl cellulose, hydroxymethyl cellulose and polyethylene oxide. The above noted illustrative materials are adaptable to numerous forms of filter core constructions such as: sponge-like foamed structures having cellular or interconnecting pores; membranes or pliable sheet-like materials suitable to be perforated, folded, plaited, crumpled or shredded; multitudinous small balls, beads or granules of regular or irregular shapes that are adaptable as bulk filters; and fibrous manifestations capable of utilization as loose felted filter media. Whatever type of core filler is utilized, the filter medium is selectively formed to have a mean flow pore size to pass the moving gas and retain the particles of predetermined maximal size.

By way of example, a cellular material suitable for a number of filter applications can be made by subjecting a viscous aqueous solution of polyvinyl alcohol to mechanical beating, whereupon the foam is dried to provide a self-supporting cellular structure. The size of the cells is determined by the viscosity of the solution and the speed of beating. If desired, the cellular block can be perforated to achieve the preferred degree of porosity.

The aforedescribed filter materials are to be used with a substantially inert gaseous medium of which ambient air is an example. Storage conditions for these filters should be substantially similar to the conditions under which the filters are utilized. Detrimental temperatures and humidity levels should be avoided.

By way of illustration, in filter collecting dry rare earth cathodoluminescent phosphor particles, such as the yttrium oxides and vanadates, the mean flow pore size would not normally exceed substantially 10.0 microns.

In collecting rare earth phosphor particles for example, the filter medium is contained in a suitable holding means or housing which is usually oriented relative to an exhaust duct in a manner to permit passage of the drawn exhaust air therethrough, the gasborne phosphor particles being retained in the core material. When the filter is laden to the point of decreasing efficiency generally determined by pressure drop across the filter, it is removed from the filter chamber and immersed in water to dissolve the filter medium. In this treatment, the water bath is raised to a temperature preferably in excess of 20 degrees centigrade and agitated to hasten dissolution of the core material. After the core material is in solution, agitation is discontinued and the phosphor particles are removed from the solution by one of several techniques. For example, by one procedure, the particles are allowed to settle from the aqueous solution; whereupon, the solution is decanted and the particles dried. By another technique, the aqueous solution with the particles suspended therein is introduced into a conventional recirculating type of filter such as a Funda processor as manufactured by the DeLaval Separator Company, Poughkeepsie, New York. In this type of filter, the core is developed during usage by collecting the phosphor material on a plurality of perforated discs. When the plates of the filter core become laden with collected particles, forced heated air is introduced into the filter unit in a manner substantially reverse to the normal liquid flow, a procedure which substantially dislodges and dries much of the phosphor material from the collector medium.

Thus there is provided a water decomposable filter medium for collecting and reclaiming water insoluble particles of gasborne materials. A method is also provided for expeditiously reclaiming the particles retained in the water soluble filter medium.

While there has been described what are at present considered the preferred embodiments of the invention, it will be obvious to those skilled in the art that various changes and modifications may be made therein without departing from the scope of the invention as defined by the appended claims.

What is claimed is:

1. A method for reclaiming water insoluble particles of gasborne materials from a moving air atmosphere comprising the steps of:
   positioning relative to said atmosphere at least one porous filter medium of at least one water soluble organic material selected from the group consisting of polyvinyl alcohol, methyl cellulose, carboxyethyl cellulose, carboxymethyl cellulose, hydroxyethyl cellulose, and polyethylene oxide, said filter material being structurally stable in an environment having an ambient relative humidity ranging less than 90 percent and an ambient temperature ranging under 100 degrees centigrade;
   moving said particle-bearing air atmosphere through said porous filter medium;
   removing said laden filter medium from the particle collecting position;
   treating said laden filter medium with moving water of a temperature in excess of 20 degrees centigrade to form an aqueous solution of said filter material; and
   removing said particles from said solution.

2. A method for reclaiming water insoluble particles of gasborne materials according to claim 1 wherein said particles are removed from said aqueous solution by allowing the particles to settle whereupon the solution is decanted and the particles dried.

3. A method for reclaiming water insoluble particles of gasborne materials according to claim 1 wherein said particles are substantially removed from said solution by the steps comprising:
   flowing the particle-containing solution into a recirculating type filter having a core of perforated discs whereupon the particles are collected; forcing heated air in a reverse manner through said recirculating type filter to dislodge and dry the particles collected therein.

4. A method for reclaiming water insoluble particles according to claim 1 wherein said particles are cathode ray tube phosphor materials.

References Cited

UNITED STATES PATENTS

| | | | |
|---|---|---|---|
| 2,029,663 | 2/1936 | Kerschbaum et al. | 55—73 |
| 2,612,966 | 10/1952 | Nicol | 55—528 |
| 3,063,787 | 11/1962 | Rynkiewicz et al. | 55—528 |
| 3,382,652 | 5/1968 | Spurny et al. | 55—528 |
| 3,400,520 | 9/1968 | Sakurai | 55—528 |
| 2,242,372 | 5/1941 | Schneider | 210—500 |
| 3,122,479 | 2/1964 | Smith | 128—296 |
| 3,281,513 | 10/1966 | Stripp et al. | 264—48 |
| 3,481,888 | 12/1969 | Sinclair | 260—25 |
| 3,239,430 | 3/1966 | Aiba et al. | 55—524 |

OTHER REFERENCES

Membrane Filters and Apparatus Bulletin 88, Carl Schleicher and Schuell Co., Keene, New Hampshire, pp. 1–15, dated May 1966.

FRANK W. LUTTER, Primary Examiner

B. NOZICK, Assistant Examiner

U.S. Cl. X.R.

55—528